United States Patent [19]
Wegner et al.

[11] Patent Number: 5,949,787
[45] Date of Patent: Sep. 7, 1999

[54] MULTI-FUNCTION FIFO COUNTER STATUS REGISTER

[75] Inventors: Glenn A. Wegner, Cupertino; Art Khachaturian, San Jose, both of Calif.

[73] Assignee: Exar Corporation, Fremont, Calif.

[21] Appl. No.: 08/923,595

[22] Filed: Sep. 4, 1997

[51] Int. Cl.[6] .................................................. H04L 12/54
[52] U.S. Cl. .......................................... 370/428; 370/429
[58] Field of Search .................................... 370/282, 276, 370/428, 429; 395/200.8, 285, 286, 280, 849, 853, 854, 856, 871

[56] References Cited

U.S. PATENT DOCUMENTS

| | | | |
|---|---|---|---|
| 4,823,312 | 4/1989 | Michael et al. | 395/891 |
| 4,949,333 | 8/1990 | Gulick et al. | 370/282 |
| 5,140,679 | 8/1992 | Michael | 395/286 |
| 5,199,105 | 3/1993 | Michael | 395/842 |
| 5,241,660 | 8/1993 | Michael et al. | 395/200.64 |
| 5,278,956 | 1/1994 | Thomsen et al. | 395/200.8 |
| 5,557,751 | 9/1996 | Banman et al. | 359/109 |
| 5,604,870 | 2/1997 | Moss et al. | 395/280 |
| 5,619,544 | 4/1997 | Lewis et al. | 375/377 |
| 5,717,870 | 2/1998 | Dobson | 395/200.8 |

*Primary Examiner*—Ajit Patel
*Assistant Examiner*—Bob A. Phunkulh
*Attorney, Agent, or Firm*—Townsend and Townsend an Crew LLP

[57] ABSTRACT

A single, standard general purpose register address accesses not only the general purpose register, but, pursuant to user programming, FIFO counter status. In one embodiment, either the receive or transmit FIFO counter status can be accessed. The use of the general purpose register address for this purpose is preferably programmed using a bit from the control register on the chip.

8 Claims, 1 Drawing Sheet

MULTI-FUNCTION FIFO COUNTER STATUS REGISTER

BACKGROUND OF THE INVENTION

The present invention relates to integrated circuits having a FIFO memory with counters indicating input and output status from the FIFO.

FIFO memories are used in a number of integrated circuits for many different purposes. It is usually desirable to be able to track the status of data that has been input to or output from the FIFO. In one example, for a universal asynchronous receiver-transmitter (UART) data is sent through the FIFO and it is desirable to track the amount of data received by the FIFO and the data transmitted by the FIFO. The FIFO may be divided into a receive FIFO and a transmit FIFO which are separately monitored.

A typical UART chip, such as the industry standard 16C550, has a limited number of address pins, and thus a limited number of registers can be directly addressed. The 16C550 includes a general purpose register which can be used as a scratch-pad register or otherwise by the user.

SUMMARY OF THE INVENTION

The present invention uses the single, standard general purpose register address to not only access the general purpose register, but, pursuant to user programming, to access FIFO counter status. In one embodiment, either the receive or transmit FIFO counter status can be accessed. The use of the general purpose register address for this purpose is preferably programmed using a bit from the control register on the chip.

In addition, in one embodiment two bits of the general purpose register are used to designate whether the receive FIFO counter status or transmit FIFO counter status is provided to the output upon being addressed, or an alternating output of the two. This selection is done only when the user has programmed the control register to select the FIFO counter mode rather than general purpose register mode.

For a fuller understanding of the nature and advantages of the invention, reference should be made to the following description taken in conjunction with the accompanying drawings.

DESCRIPTION OF THE PREFERRED EMBODIMENT

Figure 1:
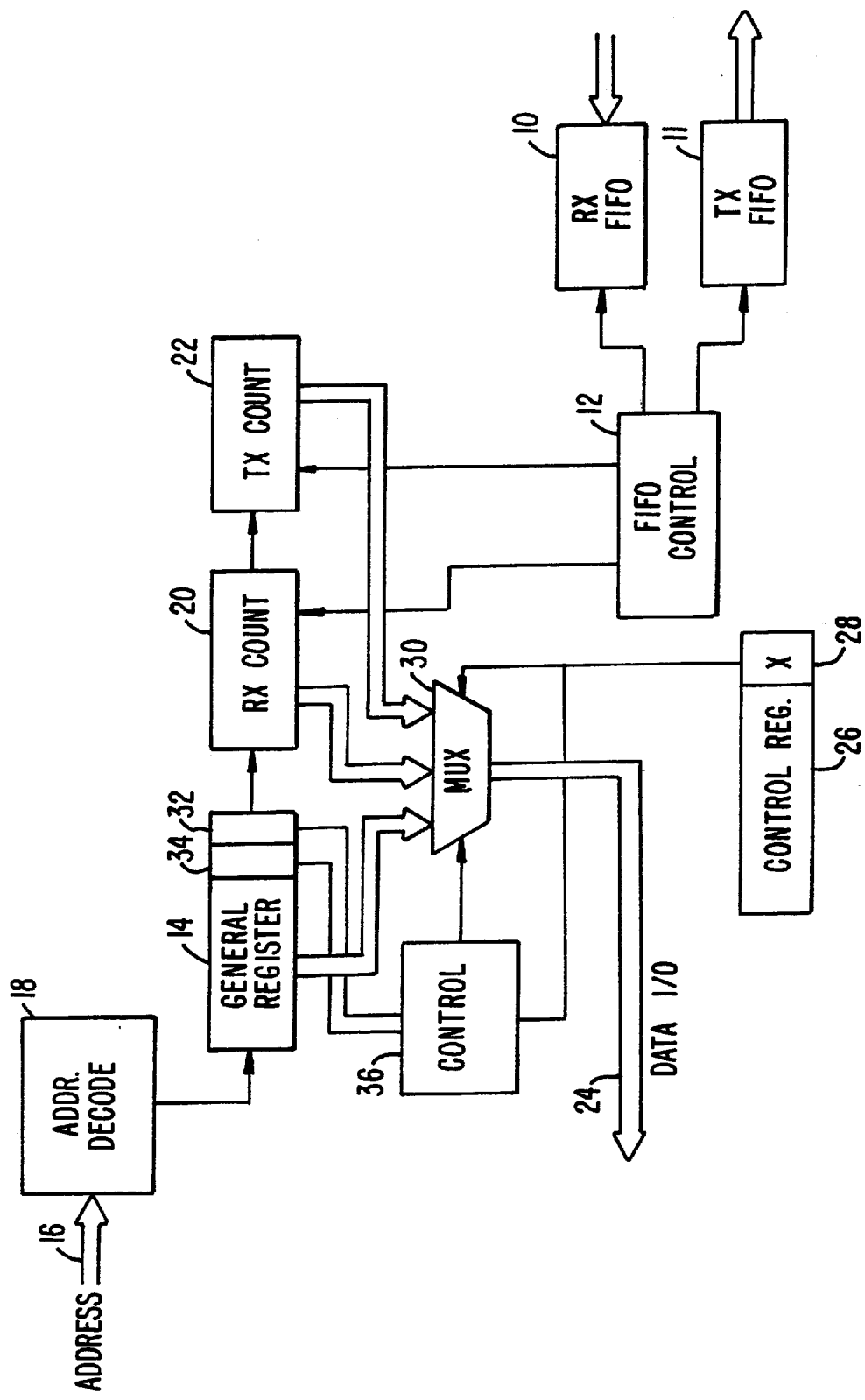
FIG. 1 is a block diagram of an embodiment of a circuit according to the present invention.

FIG. 1 is a block diagram of a portion of an integrated circuit incorporating the present invention. FIG. 1 shows a FIFO memory broken into a FIFO receive memory 10 and a FIFO transmit memory 11. A FIFO control circuit 12 is connected to both FIFOs. A general purpose register 14 is addressed by a particular address on address bus 16. The address is decoded by a decode circuit 18, which then selects general purpose register 14.

Also provided in parallel are shadow registers 20 and 22 at the same address as general purpose register 14. However, unless programmed, only register 14 is coupled to the data I/O bus 24 in response to the general purpose register address being placed on the address bus.

A control register 26 includes a bit position 28 which is connected to the select input of a multiplexer 30. In response to bit position 28 being programmed by the user, multiplexer 30 can select instead either the contents of register 20 or register 22. If bit 28 is not selected, the contents of register 14 will be provided to data I/O bus 24 as in normal operation.

In the preferred embodiment, two bits from the general purpose register 14 in the least significant bit positions 32 and 34 are provided to a control circuit 36. Control circuit 36 operates only when control mode bit 28 selects the receiver transmit counter. Depending upon the bit values at positions 32 and 34, control circuit 36 will either select receive count register 20, transmit count register 22, or alternate between the two.

In the preferred embodiment, when bit zero of general purpose register 14 is set to a logic "0" the receive FIFO counter status from register 20 is provided through multiplexer 30 to data I/O bus 24 in response to the user addressing the general purpose register. This count provides the number of received characters in the receive FIFO 10. When general purpose register 14 has bit zero set to a logic "1", the transmit FIFO counter status from transmit counter register 22 is provided through multiplexer 30 to data I/O bus 24. This provides a count of the number of empty locations in the transmit FIFO 11.

When both bit zero and one are set to "1", multiplexer 30 will alternately, on successive read cycles, provide the receive FIFO count or the transmit FIFO count from registers 20 and 22 respectively.

The above description describes how the registers 20 are read by the user. The registers can be written automatically by FIFO controller 12 internally to the chip, without user control. Alternately, a write mode could be provided in which the user writes into these internal registers with external information.

As will be understood by those of skill in the art, the present invention may be embodied in other specific forms without departing from the spirit or essential characteristics thereof. Accordingly, the foregoing description is intended to be illustrative, but not limiting, of the scope of the invention which is set forth in the following claims.

What is claimed is:

1. An integrated circuit comprising:

a FIFO memory;

a first register having a first register address;

a second, shadow register for storing a FIFO count;

a FIFO control circuit, coupled to said FIFO memory and said second register, for storing said FIFO count in said second register;

a data I/O bus;

a multiplexer having inputs coupled to said first and second registers, and an output coupled to said data I/O bus;

a control register coupled to said multiplexer for selecting said second, shadow register in response to a value in said control register, such that said FIFO count in said second, shadow register can be accessed by addressing said first register:

a third, shadow register for storing a FIFO receive counter status, said second, shadow register storing a FIFO transmit counter status, said third, shadow register being coupled to said multiplexer and said FIFO control circuit; and a multiplexer control circuit coupled to said multiplexer and at least one bit position of said first register, said multiplexer control circuit being configured to select between said second and third shadow registers responsive to a value of said at least one bit position of said first register.

2. The integrated circuit of claim 1 wherein said first register is a general purpose register, said second register is a receive FIFO status counter register, and further comprising a third register coupled to said multiplexer, said third register being a transmit FIFO status counter register.

3. The integrated circuit of claim 1 wherein two bit positions of said general purpose register are connected to said multiplexer control circuit, a first value of said two bits selecting said receive FIFO status counter register, a second value of said two bits selecting said transmit FIFO status counter register, and a third value of said two bits selecting an alternating output of said receive and transmit FIFO status counter registers.

4. The integrated circuit of claim 3 wherein said integrated circuit is a UART.

5. An integrated circuit comprising:

a FIFO memory:

a first general purpose register having a first register address;

a second, shadow register for storing a FIFO receive counter status, said second, shadow register also having said first register address;

a third, shadow register for storing a FIFO transmit counter status, said third, shadow register also having said first register address;

a FIFO control circuit, coupled to said FIFO memory and said second register, for storing said FIFO count in said second register;

a data I/O bus;

a multiplexer having inputs coupled to said first, second and third registers, and an output coupled to said data I/O bus; and a control register having a bit coupled to said multiplexer for selecting one of said second and third shadow register in response to a value in said control register, such that said FIFO count in said second, shadow register can be accessed by addressing said first register;

a multiplexer control circuit coupled to said multiplexer and at least one bit position of said first register, said multiplexer control circuit being configured to select between said second and third shadow registers responsive to a value of said at least one bit position of said first register.

6. The integrated circuit of claim 5 wherein two bit positions of said general purpose register are connected to said multiplexer control circuit, a first value of said two bits selecting said receive FIFO status counter register, a second value of said two bits selecting said transmit FIFO status counter register, and a third value of said two bits selecting an alternating output of said receive and transmit FIFO status counter registers.

7. The integrated circuit of claim 5 wherein said integrated circuit is a UART.

8. A method for providing a FIFO count in an integrated circuit having a FIFO memory, comprising:

addressing a first register with a first register address;

storing a FIFO count in a second shadow register also having said first register address;

storing a control value in a control register;

selecting said second, shadow register instead of said first register, in response to said control value, when said first register address is provided;

storing a FIFO receive counter status in a third, shadow register;

storing a FIFO transmit counter status as said FIFO count in said second, shadow register; and selecting between said second and third registers according to at least one bit of said first register.

* * * * *